(12) United States Patent
Strohmaier et al.

(10) Patent No.: US 7,568,376 B2
(45) Date of Patent: Aug. 4, 2009

(54) EXHAUST GAS SENSOR

(75) Inventors: Rainer Strohmaier, Stuttgart (DE);
Torsten Handler, Stuttgart (DE);
Bernhard Kamp, Ludwigsburg (DE);
Katharina Schaenzlin,
Rottenburg-Obernau (DE); Henrik Schittenhelm, Stuttgart (DE); Andreas Sturm, Assamstadt (DE)

(73) Assignee: Robert Bosch GmbH, Stuttgart (DE)

( * ) Notice: Subject to any disclaimer, the term of this patent is extended or adjusted under 35 U.S.C. 154(b) by 95 days.

(21) Appl. No.: 11/789,480

(22) Filed: Apr. 24, 2007

(65) Prior Publication Data

US 2008/0000286 A1  Jan. 3, 2008

(30) Foreign Application Priority Data

Apr. 24, 2006 (DE) .................... 10 2006 018 956

(51) Int. Cl.
*G01N 15/06* (2006.01)
(52) U.S. Cl. .................. 73/23.21; 73/1.02; 73/1.06; 73/23.33; 73/28.01; 702/31.03; 702/31.05; 702/100; 702/104
(58) Field of Classification Search ............. 73/23.21, 73/23.31, 23.33, 28.01, 31.01, 31.02, 31.03, 73/31.05, 1.02, 1.06; 702/99, 100, 104
See application file for complete search history.

(56) References Cited

U.S. PATENT DOCUMENTS

| 4,223,559 | A | * | 9/1980 | Chuan et al. | 73/865.5 |
|---|---|---|---|---|---|
| 4,379,402 | A | * | 4/1983 | Harman, III | 73/23.21 |
| 4,875,406 | A | * | 10/1989 | Holter et al. | 454/75 |
| 5,546,788 | A | * | 8/1996 | Dickow | 73/28.01 |
| 5,591,895 | A | * | 1/1997 | Rigby | 73/28.01 |
| 5,825,119 | A | * | 10/1998 | Shibata et al. | 310/338 |
| 6,205,842 | B1 | | 3/2001 | Patashnick et al. | |

(Continued)

FOREIGN PATENT DOCUMENTS

DE    4420193 A1  *  1/1996

(Continued)

*Primary Examiner*—David A. Rogers
(74) *Attorney, Agent, or Firm*—Merchant & Gould PC

(57) ABSTRACT

The invention concerns a procedure to determine a mass of particles or a particle mass flow in an exhaust gas system of an internal combustion engine, whereby at least one resistive particle sensor is disposed in the exhaust gas system of the internal combustion engine. The measured signal change of the particle sensor is compared with a predicted signal change of the particle sensor ascertained from an engine model.

Figure 1:
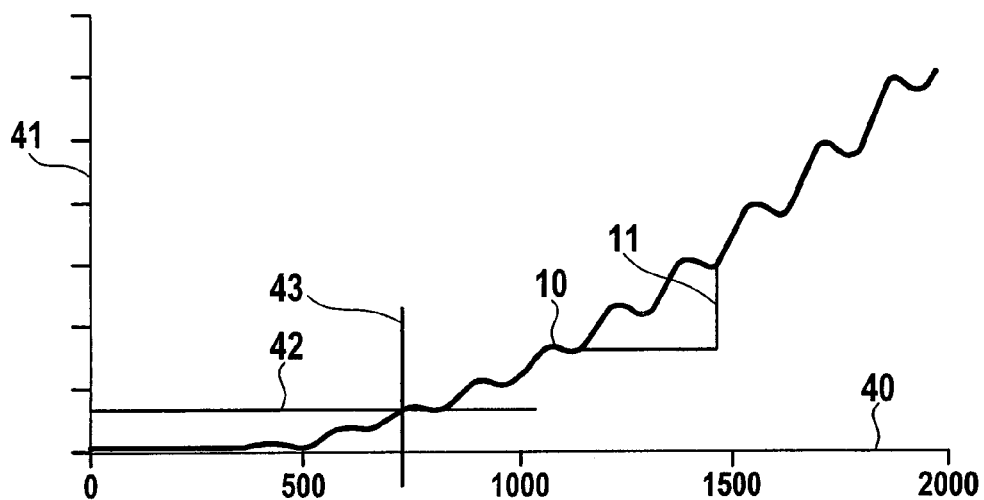

If the measured signal change of the particle sensor and/or the predicted signal change of the particle sensor are corrected while taking into account the influencing variables on the transverse sensitivities of the particle sensor, it is possible when ascertaining the predicted signal change of the particle sensor that a compensation for the transverse sensibilities can result even during dynamic operating point changes of the internal combustion engine, which occur faster than the actuation of the particle sensor. This is the case because the correction can even be implemented for small predicted signal changes, such as those occurring during a currently transpiring operating point of the internal combustion engine. Because the predicted signal changes are ascertained from a set of characteristic curves of the engine model, these measurement intervals capable of being assigned to very short times and for that reason to individual operating points of the internal combustion engine can be determined with the very small predicted signal changes, which are required for this purpose.

13 Claims, 4 Drawing Sheets

U.S. PATENT DOCUMENTS

| | | | |
|---|---|---|---|
| 7,096,855 B2 * | 8/2006 | Renner et al. | 123/494 |
| 2005/0017738 A1 * | 1/2005 | Lin et al. | 324/698 |
| 2005/0268601 A1 | 12/2005 | Pfaeffle et al. | |
| 2006/0243026 A1 * | 11/2006 | Graze et al. | 73/23.31 |
| 2007/0033925 A1 | 2/2007 | Berger et al. | |
| 2007/0089478 A1 | 4/2007 | Wirth et al. | |
| 2008/0048681 A1 * | 2/2008 | Birkhofer et al. | 324/693 |

FOREIGN PATENT DOCUMENTS

| | | |
|---|---|---|
| DE | 101 33 384 | 1/2003 |
| DE | 10 2005 040 790 | 3/2007 |
| EP | 1 746 276 | 1/2007 |
| WO | WO00/68557 | 11/2000 |
| WO | WO 2004097392 A1 * | 11/2004 |

* cited by examiner

EXHAUST GAS SENSOR

The invention deals with a procedure to determine a mass of particles or a particle mass flow in an exhaust gas system of an internal combustion engine, whereby at least one resistive particle sensor, whose measured signal change is compared with a predicted signal change of the particle sensor ascertained from an engine model, is disposed in the exhaust gas system of the internal combustion engine.

Such a resistive particle sensor is described in the German patent DE 101 33 384 A1. The particle sensor is constructed from two interlocking, comb-shaped electrodes which are partially covered by a protective sheath tube which also serves as a catch sleeve for the improvement of the depositing of particles. If particles from the exhaust gas of an internal combustion engine accumulate on the particle sensor, this can lead to an analyzable change in the impedance of the particle sensor; from which a conclusion can be drawn about the amount of accumulated particles and consequently the amount of particles carried in the exhaust gas.

Particle sensors have a strong transverse sensitivity versus external influencing variables, such as the sensor temperature, exhaust temperature or the speed of the exhaust gas. These variables influence thereby the accumulation of the particles on the sensor as well as the measured impedance of the sensor.

In U.S. application Ser. No. 11/510,198, filed Aug. 25, 2006, a procedure is described to operate a sensor for the acquisition of particles in the exhaust gas flow. Thereby at least a measurement for the exhaust gas flow at a particle sensor is ascertained and with the evaluation of the particle sensor signal provided by the particle sensor, the measurement for the exhaust gas flow is taken into account.

Additional influencing variables on the transverse sensitivities of the sensor are not taken into consideration in the described procedure. With regard to the compensation for the transverse sensitivities of the particle sensor, the problem arises, in that the particle sensor signal changes are very small. A comparatively long time can be required in order to collect a sufficient amount of particles, so that a signal change materializes which can be evaluated by the engine's electronic control unit. For this reason, a timely compensation for the transverse sensitivities can partially not be or only be very inaccurately implemented. The dynamics of the particle sensor and consequently its output signal can not during changing operational environments of the internal combustion engine be sufficient to follow the alternating operational conditions. Consequently in such a situation, no single value, for example an exhaust gas volume flow, can be assigned to a quantifiable signal change, but rather a history of the influencing parameters, which change during the time of measurement, must be attributed to it (the signal change).

In U.S. application Ser. No. 11/490,711, filed Jul. 20, 2006 and entitled, "Monitoring of Exhaust Gas Limiting Values", a procedure for the monitoring of an exhaust gas threshold value of an internal combustion engine by means of an engine management system is described, whereby the engine management system has at least one exhaust gas sensor, and an error signal is emitted when the exhaust gas threshold value is exceeded. Thereby the predicted emissions for the present operating state are ascertained with the aid of an engine model and compared with the signal of the exhaust gas sensor or with the comparative value for the emissions extracted from the signal. The exhaust gas sensor can be a collecting particle sensor. The procedure makes it possible to monitor the exhaust gas during operating cycles standardized to each other in order to establish the operating conditions of the internal combustion engine deviating from the threshold values.

It is the task of the invention to provide a procedure, which allows for a precise determination of the particle mass carried in the exhaust gas of the internal combustion engine with the aid of a resistive particle sensor.

The task of the aforementioned invention is solved, in that the measured signal change of the particle sensor and/or the predicted signal change of the particle sensor are corrected by taking into account the influencing variables on the transverse sensitivities of the particle sensor. In so doing, it is especially possible when ascertaining the predicted signal change of the particle sensor that a compensation for the transverse sensitivities can result even when dynamic operating point changes of the internal combustion engine are happening faster than the activation of the particle sensor. This is the case because the correction can be implemented even for small predicted signal changes; thus during an operating point of the internal combustion engine, which is currently transpiring. Because the predicted signal changes are ascertained from a set of characteristic curves of the engine model, these can be determined for very short time periods and consequently for measurement intervals assigned to individual operating points of the internal combustion engine with the very small predicted signal changes which are required for this purpose.

Such small signal changes cannot be evaluated with an actual particle sensor during several operating conditions due to the insufficient dynamics of the particle sensor and due to the measurement value fluctuations. Thus, a correction of the transverse sensitivities of the measured signal change, for example at the point in time of comparison with the predicted signal change, is suggested in order to take into account the momentary transverse sensitivities. The measured and predicted signal changes can be evaluated in accordance with the known methods of the gradient method and trigger method. In the case of the gradient method, the signal change corresponds to the rate of rise $dI/dt$ of the sensor current. With the trigger method, monitoring is performed to establish whether the sensor signal exceeds a specified threshold and whether the point in time when the threshold was exceeded is then defined as the trigger point in time of the particle sensor.

The primary parameters for the measuring behavior of today's particle sensors can thus be compensated for, in that in order to correct the measured signal change and/or the predicted signal change of the particle sensor, the influencing variables on the transverse sensitivities of the particle sensor are taken into account. These include exhaust gas temperature and/or temperature of the particle sensor and/or exhaust gas volume flow and/or the influence of gaseous exhaust gas components like nitrogen oxides, hydrocarbons and/or water vapor. Instead of the exhaust flow volume, the speed of the exhaust gas can be utilized. Depending upon the sensor concept used in each case, additional influencing variables can, however, also be included.

To evaluate the measured and predicted sensor signals, provision can be made in the case of a specified current threshold being exceeded or of a specified resistance threshold being undershot for the measured signal change and/or the predicted signal change to be compared with a specified trigger threshold; and if the trigger threshold is reached, the measured signal change is compared with the predicted signal change. The method enables that digital information: "threshold reached/threshold not reached" can be compared at a specific point in time, preferably that of the trigger point in time.

In a preferred embodiment of the invention, provision is made for a predicted particle mass flow accumulated on the particle sensor to be ascertained in an accumulation model from a particle mass flow predicted by an engine model while taking into account the influencing variables on the transverse sensitivities: temperature of the particle sensor, exhaust gas temperature and/or exhaust gas volume. Provision is further made for a predicted accumulated mass to be ascertained by integration from the predicted, accumulated particle mass flow and a predicted signal change to be ascertained by way of a conductivity model. The engine model depicts the particle mass flow expected for the momentary operating situation of the internal combustion engine and is delivered to the particle sensor. The accumulation model ascertains how many of the predicted particles, which have passed the particle sensor, will accumulate on the same. At the same time, the accumulation model takes into consideration that the mass of the accumulated particles for every unit of time from the predicted particle mass flow is dependant on the particle sensor's momentary influencing parameters: temperature, exhaust temperature and exhaust flow volume. Since the prediction of the very short measuring intervals can be implemented, the particle mass flow accumulated on the particle sensor can thus be determined in the momentary operating situation of the internal combustion engine. By means of integration the mass of particles accumulated at the particle sensor over an extensive period of time during different operating conditions is ascertained, which corresponds to the particle mass actually accumulated on the particle sensor if the prediction is correct and the particle sensor is in good working order. Through the conductivity model, the predicted, accumulated mass is converted into a corresponding signal of the particle sensor, with which a comparison with the measured signal of the particle sensor is then possible.

Provision is made in an additional preferred embodiment of the invention for a predicted, differential signal change of the particle sensor to be ascertained in the accumulation model from the particle mass flow predicted by the engine model while taking into account the influencing variables on the transverse sensitivities of the particle sensor: temperature of the particle sensor, exhaust gas temperature and/or exhaust gas volume flow. Provision is also made to determine the predicted signal change of the particle sensor by means of integration of the predicted, differential signal change. In this variation of the embodiment of the invention, the variable of the predicted, accumulated particle mass flow, which is difficult to determine, is not used in contrast to the variation previously described, but on the contrary the accumulation model ascertains directly a differential signal corresponding to the momentary operating conditions of the internal combustion engine while taking into account the aforementioned transverse sensitivities. Consequently the predicted signal change, which is comparable to the measured signal change, is ascertained over multiple operating points by means of integration. The advantage of this variation of embodiment lies with the fact that the accumulation model can be calibrated by measuring the signal change of a particle sensor in the exhaust gas of an internal combustion engine, which is operated with constant operating parameters. This can accordingly occur for different operating points of the internal combustion engine.

In that the influence of the actual temperature of the particle sensor on the conductivity of the particle sensor is taken into account in the conductivity model or in a first temperature correction stage to determine the predicted signal change; or in that the influence of the actual temperature in a second temperature correction to determine the measured signal change is taken into account, the predicted signal change can be directly compared with the measured signal change. Beside the accumulated mass of particles on the particle sensor, the conductivity of the particle sensor is significantly determined by the momentary temperature of the particle sensor and the temperature of the accumulated particles. Either the actual temperature of the particle sensor can be taken into account when determining the predicted signal change or the predicted signal change is determined for an established temperature of the particle sensor, and the measured signal change is converted to the established temperature. In addition to the temperature of the particle sensor, it is also conceivable to correspondingly take into consideration additional influencing variables on the conductivity of the particle sensor.

If the procedure is executed at the operational points of the internal combustion engine, at which the particle mass of the particle mass flow can be measured or predicted with a high degree of accuracy, the speed and reliability of the procedure can be markedly improved. Furthermore it is conceivable that such favorable operating conditions with regard to the decisions derived from the measurement results can be weighted separately according to their respective applications.

Provision is made in one preferred variation of the invention for a weighting factor to be determined as a function of an accumulated particle mass on the particle sensor and/or the exhaust gas temperature and/or the temperature of the particle sensor and/or the exhaust gas volume flow and/or the predicted particle mass flow and/or a measured particle mass flow. The predicted accumulated particle mass flow or the predicted, differential signal change is corrected with the weighting factor. Thus, it is taken into account that a particle mass passing the particle sensor at different times during a measuring cycle delivers variably strong contributions to the signal formation, as can especially be the case if the evaluation is performed according to the trigger method. In this instance, a particle mass accumulated immediately after regeneration of the particle sensor contributes less strongly to the actuation than a particle mass which is accumulated shortly before the actuation of the particle sensor.

Provision is made in an application of the procedure for the procedure using the onboard diagnosis (OBD) of a particle sensor in the exhaust gas tract of the internal combustion engine to be deployed, whereby a predicted particle mass flow threshold value, which is provided to the accumulation model, is determined from the particle mass flow predicted with the engine model and with a threshold filter model; whereby in a comparison stage the predicted signal change of the particle sensor is compared with the measured signal change of the particle sensor and whereby a defective particle filter is suggested if the measured signal change is greater than the predicted signal change. The particle sensor is thus disposed in the exhaust gas direction after the particle filter responsible for monitoring. The retention for particles deposited in the threshold filter model corresponds to the retention of a particle filter, which just complies with the OBD-threshold value in an operating cycle prescribed by law. The predicted signal change disburses according to the described procedure a threshold value for the measured signal change as a function of the actually transpired operational points of the internal combustion engine. If the measured signal change and with it the actually accumulated mass of particles on the particle sensor lie below the threshold filter predicted value, it can be deduced that this suggests an operational particle filter. If the measured signal on the other hand exceeds the predicted signal change, it can be deduced that this suggests a defective particle filter, because more particles reached the particle sensor than are admissible for the device.

The conclusive surety, with which a defective particle filter can be recognized, is thereby increased, in that a defective filter is suggested if in multiple consecutive measuring cycles, the measured signal change of the particle sensor is greater than the predicted signal change.

Provision is made in a preferred variation of embodiment of the invention for the particle mass flow predicted from the engine model after multiplication with a specified vector of retention factors for the particle filter to be supplied to the accumulation model as a vector of predicted particle mass flows. From the accumulation model a vector of predicted signal changes is calculated, and after comparison of the vector of predicted signal changes with the measured signal change, a retention factor for the particle filter is determined. On the basis of the determined retention factor, it can be deduced whether a defective particle filter is present. The values derived from the multiplication with the vector differentiate themselves, in that they deviate to varying degrees from the best estimated value of the engine model's predicted particle mass flow. Through the comparison of the individual values obtained by the vector for predicted signal changes with the measured signal change, the best individual values are now able to be ascertained in the vector of the assumed retention factors, on whose basis the claim concerning the degree of damage of the particle filter takes place. In the process, the actual retention factor can be determined through interpolation of adjacent, forecasting retention factors, most likely the measured signal change. With this method it is not necessary that all relevant influencing variables on the particle sensor's transverse sensitivities, such as exhaust gas volume flow, temperature of the particle sensor or particle mass flow, are recorded within a set amount of time for the integration interval. Only a significantly smaller (with regard to the memory storage capacity) vector of the predicted signal change must be recorded.

Provision is made in an additional application of the procedure for the procedure to be deployed for the adaptation of an emissions characteristic diagram of the engine model in order to determine the predicted mass of particles or to determine the predicted particle mass flow, whereby the predicted signal change of the particle sensor is compared with the measured signal change; and whereby if a deviation between the predicted signal change and the measured signal change occurs, a correction of the emissions characteristic diagram of the engine model takes place. Using the predicted mass of particles, respectively the predicted particle mass flow, a prediction concerning the depletion of the particle filter can be implemented. The correction of the emissions characteristic diagram occurs in such a manner that the particle concentrations deposited therein or the particle mass flows are increased or reduced. In so doing, drifts beyond the service life of the internal combustion engine can, for example, be acquired and compensated for appropriately. These drifts could, for example, include injection jet drifts.

A simple, deployable adaptation of the emissions characteristic diagram with a small outlay for computations can be achieved, in that the correction of the engine model occurs in such a way that all values of the emissions characteristic diagram of the engine model are multiplied with an adaptation factor, whereby the adaptation factor is determined by the relationship between the measured signal change and the predicted signal change.

The accuracy of the adaptation of the emissions characteristic diagram can be improved, in that the correction of the engine model occurs in such a way that the values of the emissions characteristic diagram of the engine model are corrected at the operating points of the internal combustion engine, which were achieved in the previous time period since the beginning of the measurement cycle. In this manner, varying correction factors can be introduced into the emissions characteristic diagram for different operating conditions of the internal combustion engine.

A further increase in the accuracy can be achieved, in that the correction of the engine model takes place in such a way that the values of the emissions characteristic diagram of the engine model are corrected at the operational points of the combustion engine; in that they are corrected with a function, which is determined in a search algorithm, which corrects the engine model up until the measured signal change and the predicted signal change correlate.

Provision is made for the particle mass flow predicted from the engine model after multiplication with a specified vector of adaptation factors to be provided to the accumulation model as a vector of predicted particle mass flows. From the accumulation model, a vector of predicted signal changes is calculated; and after comparison of the vector of predicted signal changes with the measured signal change, an adaptation factor for the emissions characteristic diagram deposited in the engine model is determined. In this way the adaptation of the emissions characteristic diagram can be implemented with a small necessitated memory storage requirement. This is the case because the operating points achieved in an integration interval with the associated exhaust gas volume flows, temperatures and particle mass flows must no longer be recorded as a function of time. It is sufficient to record the significantly smaller (with regard to the memory storage requirement) vector of the predicted signal change. This reveals itself especially during the adaptation of the emissions characteristic diagram of the engine model, in which the emissions characteristic diagram is varied up until the predicted and the measured signal change are in agreement with each other. This is the case because an especially high memory storage requirement exists as a result of this iterative procedure.

The invention is explained below using the examples of embodiment depicted in the figures. The following are shown:

FIG. 1: an output signal of a resistive particle sensor

Figure 2:
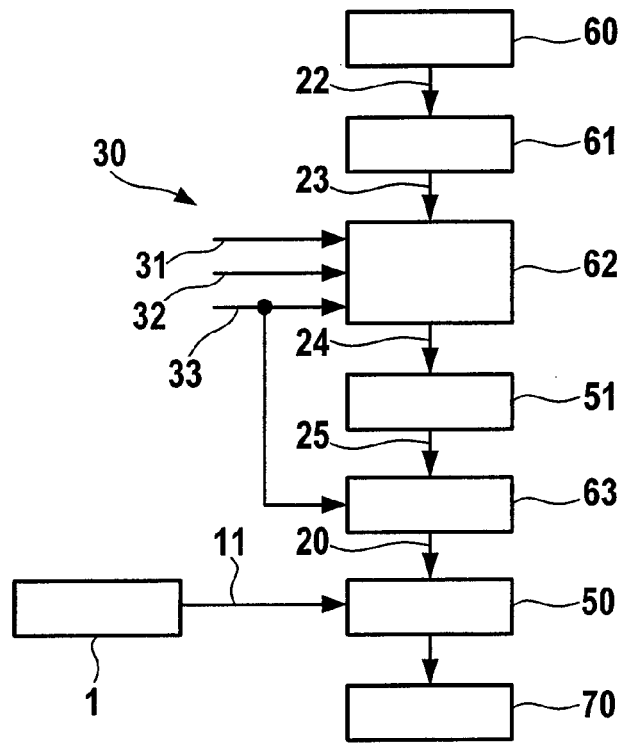

FIG. 2: a flow chart for monitoring a particle filter

Figure 3:
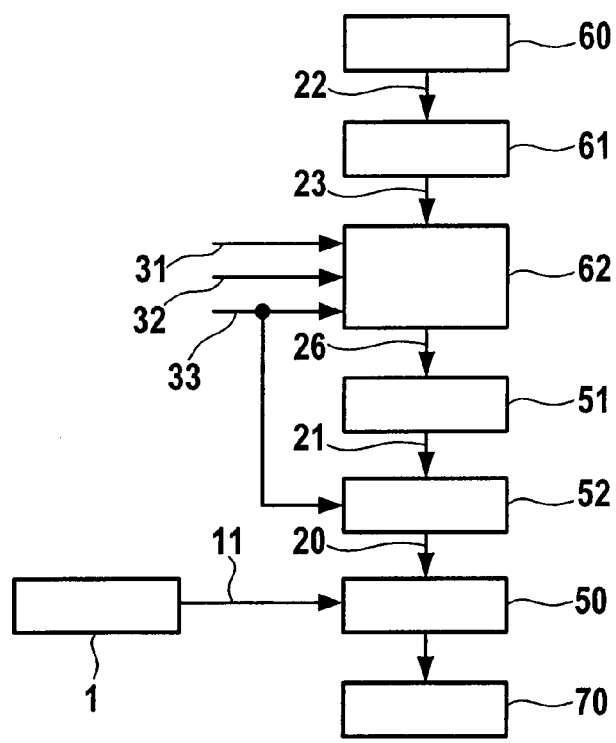

FIG. 3: a simplified flow chart for monitoring a particle filter

Figure 4:
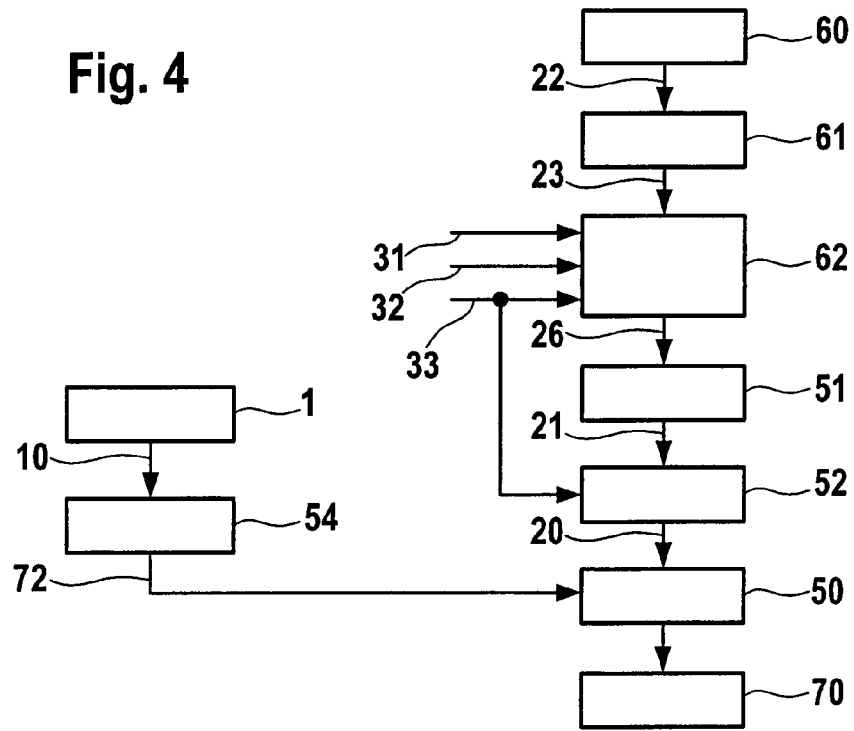
Figure 5:
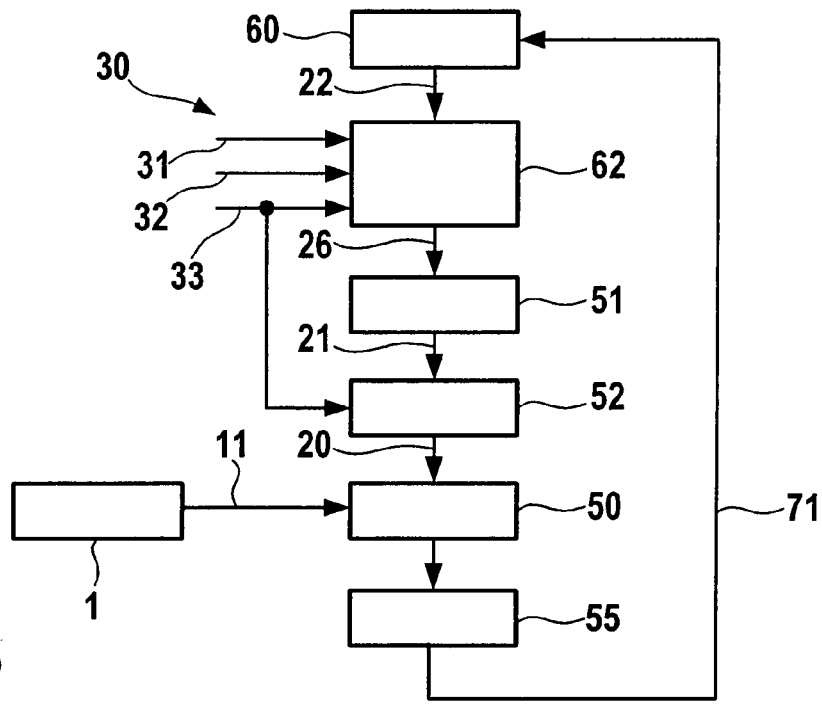
Figure 6:
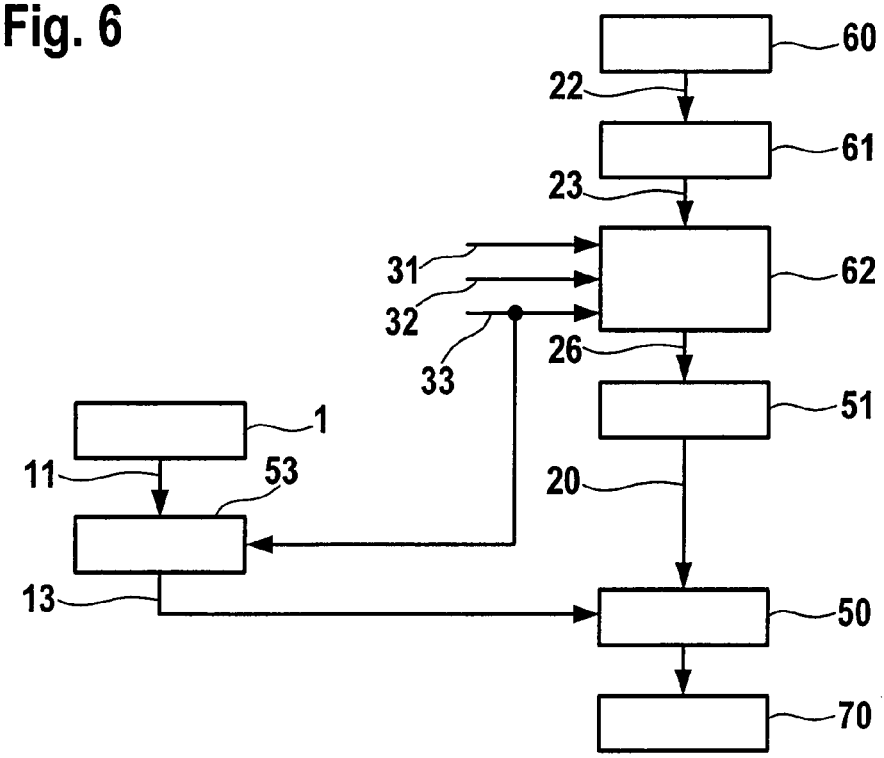
Figure 7:
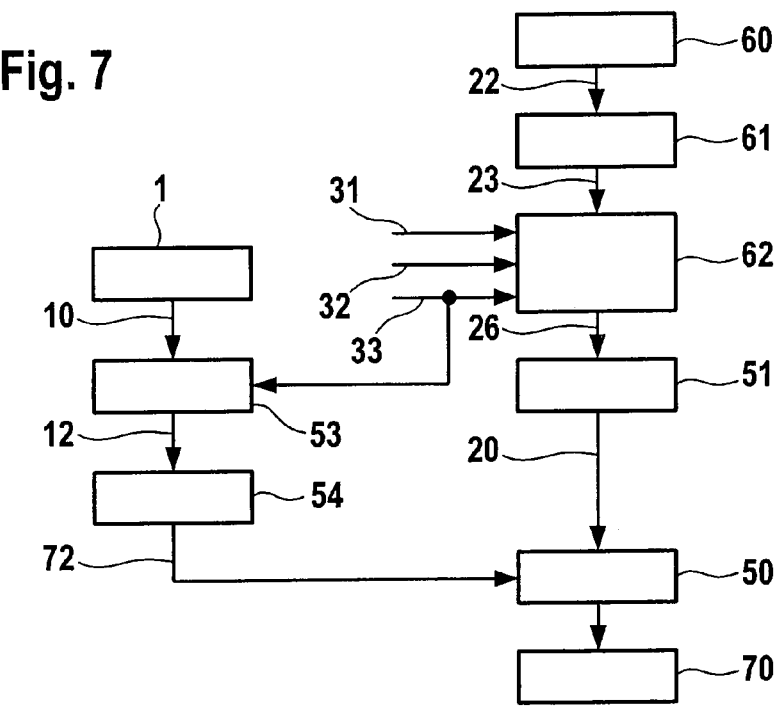
Figure 8:
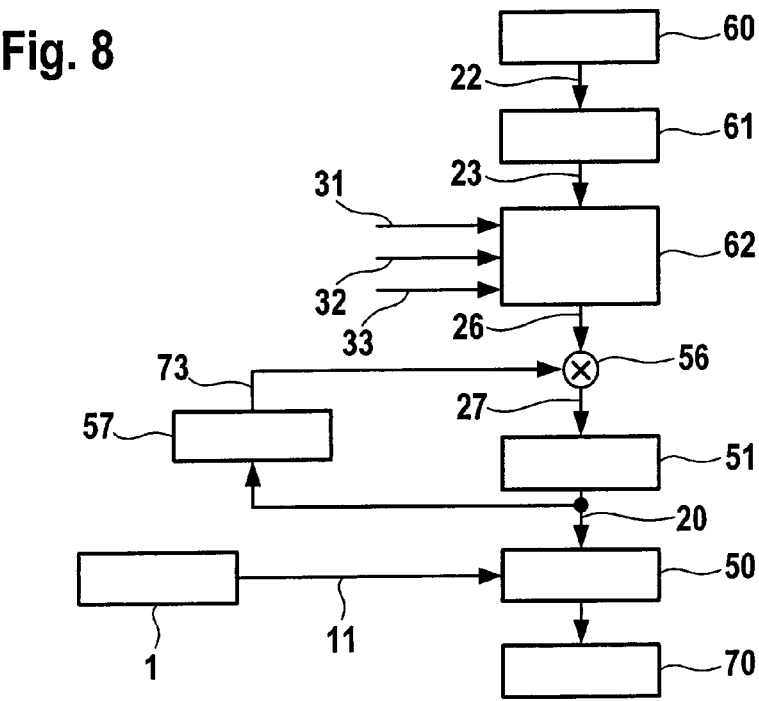

FIG. 4: a flow chart for monitoring a particle filter by means of the trigger method FIG. 5: a flow chart for the adaptation of an engine model FIG. 6: a flow chart with temperature correction of a measured sensor signal FIG. 7: an additional flow chart for monitoring a particle filter by means of the trigger method FIG. 8: flow chart for the correction of a predicted signal change of the particle sensor FIG. 1 shows an output signal of an unspecified resistive particle sensor 1, as it is used in the exhaust gas duct of an internal combustion engine, in order to determine the degree of depletion of a diesel particle filter or to monitor its functionality for an Onboard Diagnosis. The particle sensor 1 has two comb-shaped interlocking electrodes, which are exposed to the exhaust gas flow. If sooty particles accumulate, the conductivity between the electrodes increases and when impressing an electrical voltage at the particle sensor 1, an electrical current can be measured. The accumulated particle mass can be detected from the amount of the electrical current. In FIG. 1 a measured sensor signal 10 along a time axis 40 is carried off on an electrical current axis 41. With the increasing load on the sensor, the measured sensor signal 10 increases. Oscillations of the measured sensor signals occur due to a transverse sensitivity of the particle sensor 1 with the temperature. Beside the absolute level of current through the particle sensor 1, which is acquired by the measured sensor signal 10, a measured signal change 11 occurring over a specified period of time can also serve to evaluate the depletion of the particle sensor 1. After a burnout of the particle sensor 1, the loading does not initially lead to a measurable current flow, since the accumulated particles do not form a continuous current pathway between the electrodes. Normally, a minimum trigger threshold 42 is established, from which the measured sensor signal 10 is evaluated. This trigger threshold 42 is reached after a particle sensor's burnout at a trigger time point 43 and represents a measurement for the rate of accumulation on the particle sensor 1. This variation in evaluation of particle sensor's 1 output signal is called the trigger method.

FIG. 2 shows a flow chart for the monitoring of the diesel particle filter by means of the particle sensor 1. In an engine model 60 a predicted particle mass flow 22, which is provided to a threshold filter model 61, is determined on the basis of updated operating parameters of the internal combustion engine. In the threshold filter model 61, modeling is performed to see which proportion of the predicted particle mass flow 22 is retained in a marginal particle filter and which proportion penetrates it and leaves as a predicted particle mass flow threshold value 23. An accumulation model 62 serves to model the accumulation behavior of the particles in the exhaust gas present at the particle sensor 1. The influencing variables 30 on the transverse sensitivities: an exhaust gas volume flow 31, an exhaust gas temperature 32 and a temperature 33 of the particle sensor 1 are supplied to the accumulation model 62. An exhaust gas speed at the location of the particle sensor 1 can be used instead of the exhaust gas volume flow 31. From the influencing variables 30 and the predicted particle mass flow threshold value 23, the accumulation model 62 determines a predicted accumulated particle mass flow 24, which is integrated in an integration stage 51 to a predicted accumulated mass 25. In a conductivity model 63 the predicted, accumulated mass 25 is converted to a predicted signal change 20 while taking into account the temperature 33. In so doing, the conductivity model 63 takes into account both the current pathways occurring due to the formation of the particle coat and the resultant electrical resistance of the configuration as well as the temperature dependence of the specific electrical resistance of the stratified materials. The predicted signal change 20, which on account of the use of the threshold filter model 61 represents the signal change to be expected for a marginal particle filter, is compared with the measured signal change 11 in a comparison stage 50. If the measured signal change 11 is higher than the predicted signal change 20, a defective particle filter is suggested and a diagnostic signal 70 is produced. Provision can thereby be made for the diagnostic signal 70 to be produced only for multiple consecutive diagnoses of a defective particle filter in order to avoid false diagnoses.

In FIG. 3 a simplified flow chart in comparison to FIG. 2 is shown for the diagnosis of the particle filter. The predicted particle mass flow 22 determined in the engine model 60 is also in this case supplied to the threshold filter model 61, and the predicted particle mass flow threshold value 23 is determined and supplied to the accumulation model 62. In the accumulation model 62 a predicted, differential signal change 26 is, however, directly determined, which is integrated in an integration stage 51 to a predicted integral signal change 21.

In a first temperature correction stage 52 the predicted signal change 21 is determined from the predicted integral signal change 20, which in the comparison stage 50 is compared with the signal change 11 measured at the particle sensor 1.

The use of a trigger method to evaluate the capability of the particle filter is depicted in FIG. 4. The sensor signal 10 measured at the particle sensor 1 is supplied to a threshold value stage 54, in which the evaluation is made to see to what extent a specified threshold value is achieved by the measured sensor signal 10. If the threshold value is achieved, the threshold stage 54 gives a time signal 72 to the comparison stage 50, in which the comparison between the predicted signal change 20 and the measured sensor signal 10, which corresponds to the threshold value, is performed. If the predicted signal change 20 is smaller than the threshold value, a defective particle filter is suggested. The predicted signal change 20 mentioned above can concern the one since the last burnout. In this form of embodiment, the comparison takes place in the comparison stage 50 only once after each burnout of the particle sensor 1, so that the program sequence is shortened.

In addition to its application in the Onboard Diagnosis of particle filters, the procedure according to the invention can also be advantageously used to adapt the engine model 60 to the precise determination of the predicted particle mass flow 22. This application is depicted in FIG. 5. The predicted particle mass flow 22 is determined in the engine model 60 and provided to the accumulation model 62, in which it is converted into the predicted, differential signal change 26 while taking into account the influencing variables 30 on the transverse sensitivities, which comprise the exhaust gas volume flow 31, the exhaust gas temperature 32 and the temperature 33 of the particle sensor 1. The predicted integral signal change 21 is determined by means of integration in the integration stage 51. From the predicted integral signal change 21, the predicted signal change 20 is determined in the first temperature correction stage 52 while taking into account the temperature 33. In the comparison stage 50 the predicted signal change 20 is compared with the measured signal change 11 of the particle sensor 1, and an adaptation factor 71 is determined as a function of the result of the comparison in an adaptation stage 55. The adaptation factor 71 goes into the engine model 60 and is so designed that in the next run of the procedure, the difference is reduced between the predicted signal change 20 and the measured signal change 11 of the particle sensor 1. In this way, the engine model 60 models the actual relationships better. In a simple form of embodiment, the adaptation factor 71 can be the ratio between the measured signal change 11 and the predicted signal change 20. Provision can also, however, be made to change only those operating points of an emissions characteristic diagram in the engine model 60, which were achieved in the preceding driving cycle.

An especially good adaptation of the emission characteristic diagram in the engine model 60 is achieved if the influencing variables 30 on the transverse sensitivity, which ensue from the operating parameters of the internal combustion engine, are stored free from time constraints; and the adaptation takes place up until the predicted signal change 20 and the measured signal change 11 correlate. This can, however, require a large storage location. This can be avoided, in that not only an individual value of the predicted particle mass flow 22 is determined with the engine model 60 but a vector of such values, which in each case stand in a fixed relationship to the predicted particle mass flow 22. The following calculations are implemented in each case with all values of the vector. It is then ascertained in the comparison stage, which value from the vector correlates the best with the measured value. An interpolation between values from the vector can also be implemented. In this way it can be ascertained in which ratio the measured and the predicted value correlate the best. An advantage of this embodiment is that the memory storage requirement is determined only by the number of elements of the vector.

In the forms of embodiment of the invention depicted up until now, the temperature dependency of the resistance of the particle sensor 1 is taken into account in the predicted values in order to make possible the comparison with the measured values. In the embodiment according to FIG. 6, the temperature correction is in contrast performed on the measured signal. As in FIG. 4, the predicted, differential signal change 26 is provided on the basis of the operating parameters of the internal combustion engine to the emissions characteristic diagram in the engine model 60 after being processed in the threshold filter model 61 and the accumulation model 62. From this predicted, differential signal change 26, the predicted signal change 20, which in this case is not corrected with the temperature 33, is produced in the integration stage 51. The measured signal change 11 provided by the particle sensor 1 is converted in a second temperature correction stage 53, which takes into consideration the temperature 33 of the particle sensor 1, into a measured, temperature corrected signal change 13, which is compared with the predicted signal change 20 in the comparison stage 50. That is the reason in this case why the comparison takes place with signals characteristic of a selected temperature.

In FIG. 7 a form of embodiment of the Onboard Diagnosis is depicted according to the trigger method, in which the temperature correction is performed on the measured sensor signal 10. As in FIG. 6 the predicted signal change 20 is produced on the basis of the engine model 60. The particle sensor 1 produces the measured sensor signal 10, which is provided to the second temperature correction stage 53, which produces a measured, temperature corrected sensor signal 12, which is provided to the threshold value stage 54. If the measured, temperature corrected sensor signal 12 achieves the specified threshold value, the time signal 72 is produced, which prompts the comparison stage 50 to compare the measured, temperature corrected sensor signal 12 with the predicted signal change 20 for the entire measurement cycle. If the measured, time corrected sensor signal 12 is greater that the predicted signal change 20, a defective particle filter is suggested and the diagnostic signal 70 is released.

Provision can be made to take into account an additional transverse sensitivity of the particle sensor 1, in that the accumulation of particles on a particle sensor 1, which has just undergone a burnout, is weighted differently in the prediction than the accumulation on a particle sensor 1, which is already coated with particles. Such a form of embodiment is depicted in FIG. 8. As already depicted in FIG. 7, the predicted, differential signal change 26 is ascertained on the basis of the engine model 60. From the predicted signal change 20 since the last burnout, which represents the depletion of the particle sensor 1, this depletion is evaluated in a weighting stage 57 and a weighting factor 73 is released, which takes into account the differing accumulation behavior for different degrees of depletion of the particle sensor 1. In a multiplication stage 56, the predicted, differential signal change 26 is multiplied by the weighting factor 73 and the weighted, predicted, differential signal change 27 is calculated, from which the predicted signal change 20 since the last burnout is calculated in the integration stage 51. This predicted signal change 20 is compared with the measured signal change 11 of the particle sensor 1 in the comparison stage 50.

In an expansion of the form of embodiment, additional influencing factors on the weighting factor 73 can be taken into account. These include the exhaust gas volume flow 31, the exhaust gas temperature 32, the temperature 33 of the particle sensor 1 or a particle mass flow in the exhaust gas duct. In an additional form of embodiment, the weighting factor can be applied to the predicted particle mass flow 22 rather than to the predicted, differential signal change 26.

The invention claimed is:

1. A method of determining a mass of particles or a particle mass flow in an exhaust gas system, of an internal combustion engine, having at least one resistive particle sensor, the method comprising:
   comparing a measured signal change of the particle sensor to a predicted signal change of the particle sensor;
   when a specified current threshold is exceeded or a specified resistance threshold is undershot, comparing the measured signal change or the predicted signal change to a specified trigger threshold;
   when the trigger threshold is achieved, comparing the measured signal change to the predicted signal change; and
   correcting the measured signal change or the predicted signal change while taking into account influencing variables on transverse sensibilities of the particle sensor.

2. A method according to claim 1, wherein the influencing variables on the transverse sensibilities of the particle sensor include exhaust gas temperature, temperature of the particle sensor, exhaust gas volume flow, or amount of nitrogen oxides, hydrocarbons, or water vapor.

3. A method according to claim 1, wherein the procedure is implemented at the operating points of the internal combustion engine, at which the mass of the particles or the particle mass flow can be measured or predicted with a high degree of accuracy.

4. A method of determining a mass of particles or a particle mass flow in an exhaust gas system, of an internal combustion engine, having at least one resistive particle sensor, the method comprising:
   comparing a measured signal change of the particle sensor to a predicted signal change of the particle sensor; and
   correcting the measured signal change or the predicted signal change while taking into account influencing variables on transverse sensibilities of the particle sensor;
   wherein a predicted, accumulated particle mass flow at the particle sensor is ascertained in an accumulation model from a particle mass flow predicted from the engine model while taking into account the influencing variables on the transverse sensibilities: temperature of the particle sensor, exhaust gas temperature, or exhaust gas volume flow; and in that a predicted, accumulated mass and a predicted signal change of the particle sensor by way of a conductivity model are ascertained by means of integration from the predicted, accumulated particle mass flow.

5. A method of determining a mass of particles or a particle mass flow in an exhaust gas system, of an internal combustion engine, having at least one resistive particle sensor, the method comprising:
   comparing a measured signal change of the particle sensor to a predicted signal change of the particle sensor; and
   correcting the measured signal change or the predicted signal change while taking into account influencing variables on transverse sensibilities of the particle sensor;

wherein a predicted, differential signal change of the particle sensor is ascertained in the accumulation model from the particle mass flow predicted from the engine model while taking into account the influencing variables on the transverse sensibilities of the particle sensor: temperature of the particle sensor, exhaust gas temperature, or exhaust gas volume flow; and in that the predicted signal change of the particle sensor is determined by means of integration of the predicted, differential signal change.

6. A method of determining a mass of particles or a particle mass flow in an exhaust gas system, of an internal combustion engine, having at least one resistive particle sensor, the method comprising:

comparing a measured signal change of the particle sensor to a predicted signal change of the particle sensor; and correcting the measured signal change or the predicted signal change while taking into account influencing variables on transverse sensibilities of the particle sensor;

wherein an influence of a current temperature of the particle sensor on the conductivity of the particle sensor is taken into account in a conductivity model or in a first temperature correction stage in order to determine the predicted signal change, or in that the influence of the current temperature is taken into account in a second temperature correction in order to determine the measured signal change.

7. A method of determining a mass of particles or a particle mass flow in an exhaust gas system, of an internal combustion engine, having at least one resistive particle sensor, the method comprising:

comparing a measured signal change of the particle sensor to a predicted signal change of the particle sensor;

correcting the measured signal change or the predicted signal change while taking into account influencing variables on transverse sensibilities of the particle sensor; and correcting a predicted, accumulated particle mass flow or the predicted, differential signal change using a weighting factor determined as a function of a particle mass accumulated on the particle sensor, a exhaust gas temperature, a temperature of the particle sensor, a exhaust gas volume flow, a predicted particle mass flow, or a measured particle mass flow.

8. An on-board diagnostic system of a particle filter deployed in an exhaust gas system of an internal combustion engine, the on-board diagnostic system determining a predicted particle mass flow threshold value, which is supplied to an accumulation model, from a particle mass flow predicted with an engine model and a threshold filter model; comparing a predicted signal change of the particle sensor with a measured signal change of the particle sensor; and suggesting a defective particle filter if the measured signal change of the particle sensor is greater than the predicted signal change.

9. A system according to claim 8, wherein a defective particle filter is suggested if in multiple, consecutive measurement cycles, the measured signal change of the particle sensor is greater than the predicted signal change.

10. A system according to claim 8, wherein the system is deployed to determine a predicted mass of particles or the predicted particle mass flow, wherein the predicted signal change of the particle sensor is compared with the measured signal change and whereby in a case of a deviation between the predicted signal change and the measured signal change, a correction of an emissions characteristic diagram of an engine model results.

11. A system according to claim 10, wherein the correction of the engine model results in such a way that all values of the emissions characteristic diagram of the engine model are multiplied with an adaptation factor, wherein the adaptation factor is determined from the ratio between the measured signal change and the predicted signal change.

12. A system according to claim 10, wherein the correction of the engine model results in such a way that values of the emissions characteristic diagram of the engine model are corrected at operating points of the internal combustion engine, which were achieved in a previous time period since the beginning of the measurement cycle.

13. A system according to claim 10, wherein the correction of the engine model results in such a way that values of the emissions characteristic diagram of the engine model are corrected at the operating points of the internal combustion engine, in that they are corrected with a function, which is determined in a search algorithm, which corrects the engine model up until the measured signal change and the predicted signal change correlate.

* * * * *